United States Patent
Criel et al.

(10) Patent No.: US 11,181,233 B2
(45) Date of Patent: Nov. 23, 2021

(54) PLASTIC LINER FOR A COMPOSITE PRESSURE VESSEL

(71) Applicant: PLASTIC OMNIUM ADVANCED INNOVATION AND RESEARCH, Brussels (BE)

(72) Inventors: Bjorn Criel, Sint-Martens-Lennik (BE); Francois Dougnier, Hever (BE)

(73) Assignee: PLASTIC OMNIUM ADVANCED INNOVATION AND RESEARCH, Brussels (BE)

( * ) Notice: Subject to any disclaimer, the term of this patent is extended or adjusted under 35 U.S.C. 154(b) by 485 days.

(21) Appl. No.: 15/320,482

(22) PCT Filed: Jun. 24, 2015

(86) PCT No.: PCT/EP2015/064195
§ 371 (c)(1),
(2) Date: Dec. 20, 2016

(87) PCT Pub. No.: WO2015/197661
PCT Pub. Date: Dec. 30, 2015

(65) Prior Publication Data
US 2018/0149312 A1     May 31, 2018

(30) Foreign Application Priority Data

Jun. 24, 2014  (EP) .................................. 14173751

(51) Int. Cl.
| | |
|---|---|
| *B32B 27/08* | (2006.01) |
| *B32B 7/12* | (2006.01) |
| *B32B 1/02* | (2006.01) |
| *B32B 7/02* | (2019.01) |
| *B32B 27/20* | (2006.01) |
| *F17C 1/02* | (2006.01) |
| *F17C 1/00* | (2006.01) |
| *F17C 13/00* | (2006.01) |
| *B32B 27/30* | (2006.01) |

(52) U.S. Cl.
CPC ............... *F17C 1/005* (2013.01); *B32B 7/12* (2013.01); *B32B 27/08* (2013.01); *B32B 27/304* (2013.01); *B32B 27/306* (2013.01); *F17C 1/02* (2013.01); *B32B 2307/7242* (2013.01); *F17C 2203/0604* (2013.01); *F17C 2203/066* (2013.01); *F17C 2209/2109* (2013.01); *F17C 2209/232* (2013.01)

(58) Field of Classification Search
None
See application file for complete search history.

(56) References Cited

U.S. PATENT DOCUMENTS

| | | | | |
|---|---|---|---|---|
| 4,977,004 | A | * 12/1990 | Bettle, III | ............... B32B 27/28 229/5.84 |
| 6,506,830 | B1 | 1/2003 | Bussi et al. | |
| 2003/0171524 | A1 | * 9/2003 | Mihan | ..................... C08F 10/02 526/348.5 |
| 2009/0026282 | A1 | * 1/2009 | Bonnet | ..................... B32B 1/08 237/69 |
| 2010/0068561 | A1 | 3/2010 | Rohwer et al. | |
| 2011/0094612 | A1 | 4/2011 | Bonnet et al. | |
| 2012/0237747 | A1 | 9/2012 | Tai et al. | |

FOREIGN PATENT DOCUMENTS

| | | |
|---|---|---|
| CN | 101672422 A | 3/2010 |
| CN | 102712182 A | 10/2012 |
| JP | 03-143632 | 6/1991 |
| JP | 2008-164133 | 7/2008 |
| JP | 2010-500193 | 1/2010 |
| JP | 2012-107243 | 6/2012 |
| WO | WO 2011/068105 | 6/2011 |

OTHER PUBLICATIONS

International Search Report dated Jul. 17, 2015 in PCT/EP2015/064195 filed Jun. 24, 2015.
Japanese Office Action in corresponding application No. 2016-574942 dated Jun. 10, 2019. (w/English Translation).

* cited by examiner

*Primary Examiner* — Sheeba Ahmed
(74) *Attorney, Agent, or Firm* — Oblon, McClelland, Maier & Neustadt, L.L.P.

(57) ABSTRACT

It is proposed a plastic liner for the storage of hydrogen, comprising: a first barrier layer (3), a second barrier layer (7) configured to be an inner layer in contact with hydrogen, at least one intermediate layer arranged between the first and the second barrier layers, wherein the second barrier layer (7) has a lower hydrogen permeability than said at least intermediate layer such that the second barrier layer (7) slows down the migration of hydrogen inside said at least one intermediate layer.

9 Claims, 2 Drawing Sheets

PLASTIC LINER FOR A COMPOSITE PRESSURE VESSEL

Field of the Invention

The present invention relates to a plastic liner for a composite pressure vessel. In particular, it relates to a plastic liner for the storage of hydrogen.

Background of the Invention

Some vehicles use compressed gas as fuel, in particular hydrogen. Generally, such vehicles are equipped with a composite pressure vessel. Generally, the composite pressure vessel comprises a liner for the storage of hydrogen.

Both metallic and non-metallic liners are used, but non-metallic liners are preferred because of their lighter weight.

Non-metallic liners may be of the monolayer type or multilayer type. Generally, liners of the monolayer type comprise a single layer of polyamide. Generally, liners of the multilayer type comprise a structure of 6 layers: an inner thermoplastic-based layer (preferably, HDPE), a first layer of adhesive, a layer comprising a barrier resin (preferably, EVOH), a second layer of adhesive, a layer of regrind and an outer thermoplastic-based layer.

An outer filament winding is applied around the liner. The filament winding can come in the form of a carbon fiber filament composite wound around the outside of the liner.

It has been found that these known liners suffer from the relatively high permeability of hydrogen in polymers. Hydrogen may concentrate in certain areas inside the polymer. This accumulation generates bubbles at pressure release. This bubble formation is referred to herein as blistering. This blistering may cause damage in the form of cracking or mechanical degradation of the liner.

Summary of the Invention

In view of the above-mentioned disadvantage, there exists a need for an improved plastic liner for the storage of hydrogen.

In order to overcome this disadvantage, while preserving the mechanical characteristics (resistance, flexibility and weight) of the liner, the present invention proposes a plastic liner for the storage of hydrogen comprising:
a first barrier layer,
a second barrier layer which is an inner layer in direct contact with hydrogen,
at least one intermediate layer arranged between the first and the second barrier layers,
wherein the second barrier layer has a lower hydrogen permeability than said at least intermediate layer such that the second barrier layer slows down the migration of hydrogen inside said at least one intermediate layer.

Detailed Description of the Invention

Thus, it is proposed a multilayer structure liner with controlled diffusivity. More precisely, it is proposed a multilayer structure liner in which the intermediate layer is protected by the second barrier layer (i.e. inner layer). The intermediate layer is in contact on one side with the first barrier layer and on the other side with the second barrier layer. According to the invention, the inner layer (i.e. layer which is in direct contact with hydrogen) has lower hydrogen permeability (resulting for example from higher crystallinity) than the intermediate layer(s), so as to slow down the migration (i.e. reduce the diffusion rate) of hydrogen inside the multilayer structure. In other word, the inner layer (i.e. second barrier layer) acts as a diffusion-delay layer. Using such diffusion-delay layer allows protection of the liner against the cracking effects due to blistering.

It is to note that the driving force behind the mass transfer of a species through a medium is caused by a gradient of concentration of the species in this medium, resulting in a matter flux. The flux is linked to the concentration gradient and mass diffusivity is defined as the coefficient of proportionality in the relationship between flux and gradient. The higher the diffusivity, the faster the species moves into the medium.

In a particular embodiment, a single layer (i.e. intermediate layer) is arranged between the first and the second barrier layers. In this embodiment, the single layer can be for example a thermoplastic based layer.

In another particular embodiment, at least one thermoplastic-based layer and at least one adhesive layer are arranged between the first and the second barrier layers. In this embodiment, the structure of thermoplastic-based layer(s) and the adhesive layer(s), which is sandwiched in between the first and the second barrier layers, forms an intermediate layer.

The term "thermoplastic" is understood to mean any thermoplastic polymer, including thermoplastic elastomers, and also blends thereof. The term "polymer" is understood to mean both homopolymers and copolymers (especially binary or ternary copolymers), for example random copolymers, linear block copolymers, other block copolymers and graft copolymers, etc.

The plastic of the thermoplastic-based layer is generally a polyolefin. Preferably, the polyolefin is a polyethylene. Good results can be obtained with a high-density polyethylene (HDPE).

The multilayer structure includes a first barrier layer. Preferably, the first barrier layer is made of ethylene/vinyl alcohol copolymer (EVOH) with a low ethylene content.

Preferably, the inner layer (i.e. second barrier layer) is made of materials selected from the following list: polyvinylidenefluoride (PVDF), polyvinyldichloride (PVDC), ethylene/vinyl alcohol copolymer (EVOH), aromatic nylon, aliphatic nylon, amorphous nylon, polyethylene terephthalate (PET), LCP and propylene glycol alginate (PGA). In the case of the use of an EVOH material as inner layer, the ethylene content of the ethylene/vinyl copolymer may be higher than the ethylene content in the EVOH material used as barrier layer.

Due to the brittleness of the EVOH material having a very low hydrogen permeability, it is not possible to position such material at the surface in contact with hydrogen, as inner barrier layer. Such EVOH grades are situated more in the center of the structure (i.e. first barrier layer). Conversely, the EVOH material having a higher hydrogen permeability compared to the first barrier layer is situated at the surface, as inner barrier layer. This prevents the blistering effect in the intermediate layer. The hydrogen permeability of the first barrier layer is at least 20% lower compared to the hydrogen permeability of the inner layer.

In another particular embodiment, the inner layer can be in the form of a PVOH coating. For example, this PVOH coating can be obtained by thermal spray.

In another particular embodiment, the inner layer can be obtained by applying a surface treatment, for example fluorination or sulfonation, on a HDPE based layer.

In yet another particular embodiment, the inner layer can be a grafted maleic anhydride so as to increase the bonding with a line boss (of a composite pressure vessel) which is typically made of metal.

In a particularly advantageous embodiment, the inner layer can further contain fillers such as, for example, fibrous fillers (carbon fibres, natural fibres, glass fibres . . . ), glass (hollow) spheres, 2D fillers (clay as montmorillonite, vermiculite, talc, carbon compounds like graphene and expanded graphite) or glass (generally hollow) spheres and powders (carbon black, barium sulfate, crushed clay and talc). The addition of such fillers in the inner layer (for example, a PVDF based layer) provides a maze effect, hence reducing the hydrogen diffusion rate.

Alternatively, one or more polar groups can be added in the inner layer so as to increase its crystallinity, hence reducing the hydrogen diffusion rate.

The inner layer is preferably as thin as possible in order to preserve as much as possible the mechanical characteristics (resistance, flexibility and weight) of the liner.

In a particular embodiment, the thickness of the multilayer structure liner is comprised between 0.5 mm and 5 mm, preferably between 0.75 mm and 4 mm, and more preferably higher than or equal to 1 mm. Thus, with such thickness, the multilayer structure liner has a reduced weight and an optimized internal volume, allowing an easier integration of the structure within the vehicle architecture.

It is a further aspect of the present invention to provide for a first method of producing the plastic liner comprising the following steps:

extruding a multilayer parison tube having a first barrier layer, at least one intermediate layer and an inner layer (i.e. second barrier layer) having a lower hydrogen permeability than said at least one intermediate layer;

clamping the parison tube into a hollow cavity mould;

blowing the parison against the cavity; and removing the molded plastic liner from the mould.

It is yet another aspect of the present invention to provide for a second method of producing the plastic liner comprising the following steps:

extruding a multilayer parison tube having a first barrier layer and at least one intermediate layer;

clamping the parison tube into a hollow cavity mould;

blowing the parison against the cavity;

removing the molded plastic liner from the mould; and coating the interior wall of the molded plastic liner with an inner layer (i.e. second barrier layer) having a lower hydrogen permeability than said at least one intermediate layer.

In an alternative embodiment, the plastic liner can be formed by using injection molding. For example, the different layers of the plastic liner can be co-injected or sequentially injected.

The inner layer according to the present invention has low permeability to hydrogen compared to the intermediate layer. Permeability is the product of diffusivity and solubility. According to one alternative, it is proposed a plastic liner for the storage of hydrogen, comprising at least one intermediate layer and an inner layer having a lower hydrogen solubility than said at least one intermediate layer. In such alternative, the inner layer can have lower hydrogen solubility than the intermediate layer and higher hydrogen diffusivity than the intermediate layer (as long as the resulting permeability is lower than the permeability of the intermediate layer).

As mentioned above, a liner may be designed not merely to serve as fluid barriers but also to act as a mandrel during filament winding when the vessel is fabricated using that method. During the filament winding process it is necessary to put an important pressure on the impregnated fibers to obtain a good packaging of the composite structure to prevent bubbles leading to a pressure vessel break. The solution currently on the market consists of a liner of important thickness, which considerably increases the weight of the pressure vessel and thus increases the fuel consumption.

It is a further aspect of the present invention to provide for a plastic liner for the storage of hydrogen with reduced thickness, while maintaining good mechanical strength for supporting the filament winding process and without jeopardizing the structure liner integrity after the filament winding process or any other process allowing to pact a composite reinforcement around the liner in order to manufacture a composite pressure vessel.

One subject of the present invention is therefore a plastic liner for the storage of hydrogen, comprising at least one intermediate layer and at least one layer based on a reinforced thermoplastic composition.

The reinforced thermoplastic composition increases the modulus of 10%, in comparison with the non-reinforced material.

Reinforced thermoplastic composition is known per se, but not using such a composition in a multilayer structure of a liner for the storage of hydrogen.

The plastic liner according to the present invention can comprise one or more layers of reinforced thermoplastic composition.

The term "reinforced" is understood, within the context of the present invention, to mean comprising a (mixture of) reinforcement(s) in the dispersed state (i.e. in the form of "free" particles, mixed with the plastic, as opposed to woven or entangled particles (fibres) as in a woven fabric or a mat), in an amount such that it has a significant influence on the mechanical properties of the composition. At this stage a distinction should be made between (i) microscopic fillers/reinforcements for which a significant influence on the properties is obtained with high filling levels (typically greater than 10%) and (ii) nanofillers for which large variations in properties are obtained with only a few % of reinforcements.

Generally, these are fibrous reinforcements (carbon fibres, natural fibres, glass fibres, etc.), beads (for example glass beads, generally hollow beads) or platelets (talc, clays, montmorillonite, vermiculite, expanded graphite, graphene for example). They are preferably fibres. Powders (carbon black, chalk, talc, barium sulphate, etc.) are not generally considered to be reinforcements within the context of the invention except, of course, for those which could have a significant impact on the mechanical properties of the composition. Glass fibres give good results within the context of the invention, and, in particular, short and long glass fibres. For the short fibres, good results have been obtained by dispersing, in HDPE, fibres based on E-type glass (in particular provided with a sizing agent and/or a compatibilizer such as PE-g-MAH), having a diameter between 10 and 20 μm and an initial length between 2 and 8 mm.

According to one preferred variant, glass fibres are chosen as the reinforcement that are incorporated (preferably homogeneously, generally by mixing in an extruder in order to make masterbatch granules) in an amount of 10-50%.

In one advantageous embodiment, the plastic liner according to the present invention comprises at least one intermediate layer, an inner layer having a lower hydrogen permeability than said at least one intermediate layer, and at least one layer based on a reinforced thermoplastic composition.

Preferably, the layer of reinforced thermoplastic composition is not the inner layer of the multilayer structure.

Preferably, the layer of reinforced thermoplastic composition is the outer layer of the multilayer structure. In another particular embodiment, the layer of reinforced thermoplastic composition can be an intermediate layer of the multilayer structure.

Using such layer of reinforced thermoplastic composition allows reducing the thickness of the liner (especially, the thickness of intermediate layer(s)), hence reducing weight of the overall storage system, reducing the number of fibers coiling turn, and improving the packaging on the car (higher usable volume for a given space on the car).

The present invention is illustrated in a non limitative way by the examples below relying on FIGS. 1 to 4 attached. In these figures, identical layers bear identical reference numbers.

FIG. 1 is a schematic cross-sectional view of a multilayer structure of a plastic liner according to a first particular embodiment of the present invention. As illustrated in FIG. 1, the plastic liner can comprise an inner layer (7) based on PVDF, a first layer of adhesive (6), an intermediate layer (5) based on HDPE, a second layer of adhesive (4), a barrier layer (3) based on EVOH, a third layer of adhesive (2) and an outer layer (1) based on HDPE.

A multilayer structure combining PVDF layer and EVOH layer presents the advantage of increasing the barrier effect (i.e. reducing/eliminating risks of gas permeation), while protecting efficiently the liner against the cracking effects due to blistering.

FIG. 2 is a schematic cross-sectional view of a multilayer structure of a plastic liner according to a second particular embodiment of the present invention. As illustrated in FIG. 2, the plastic liner can comprise an inner layer (7) based on PVDF, a first layer of adhesive (6), an intermediate layer (5) based on HDPE, a second layer of adhesive (4), a barrier layer (3) based on EVOH, a third layer of adhesive (2), a layer of regrind (8) and an outer layer (1) based on HDPE.

The term "regrind" is understood to mean a plastic obtained by grinding the scraps obtained at various stages of the manufacture of a hollow body, for example a fuel tank/pipe or a plastic liner according to the present invention, or by grinding such objects at the end of their life time.

FIG. 3 is a schematic cross-sectional view of a multilayer structure of a plastic liner according to a third particular embodiment of the present invention. As illustrated in FIG. 3, the plastic liner can comprise an inner layer (7) based on PVDF, a tie layer (5'), a first layer of adhesive (4), a barrier layer (3) based on EVOH, a second layer of adhesive (2) and an outer layer (1) based on HDPE.

In a fourth particular embodiment of the present invention (not illustrated), the plastic liner can comprise an inner layer based on PVDF, a layer of adhesive and an outer layer based on polyamide.

The term "polyamide" is understood to mean any homopolymer based on an amide unit, any copolymer comprising at least two different amide units and any copolymer comprising at least 50% by weight of units derived from an amide. It does not matter whether the amide units of this definition are obtained by the opening of the ring of a cyclic polyamide or by the polycondensation of a dicarboxylic acid with a diamine. As examples of polyamides that can be used, mention may be made, non-limitingly, of: PPA (polyphthalamide), PA-6, PA-11, PA-12 and n-mXD6 (polyarylamide). PA-6 is generally preferred.

In a variant of the invention, the inner layer based on PVDF can be replaced by an inner layer based on EVOH.

FIG. 4 is a schematic cross-sectional view of a multilayer structure of a plastic liner according to a fourth particular embodiment of the present invention.

As illustrated in FIG. 4, the plastic liner can comprise an inner layer (16) based on HDPE, a first layer of adhesive (15), a barrier layer (14) based on EVOH, a second layer of adhesive (13), a layer of regrind (12) and an outer layer (11) based on a reinforced thermoplastic composition.

The invention also concerns a composite pressure vessel comprising a plastic liner as described above.

The invention also concerns a vehicle comprising a plastic liner as described above.

The plastic layer of the present invention is particularly suited for the storage of hydrogen.

In another particular embodiment, the plastic liner of the present invention is adopted for the storage of other types of gas, and in particularly for the storage of compressed natural gas.

Figure 1:
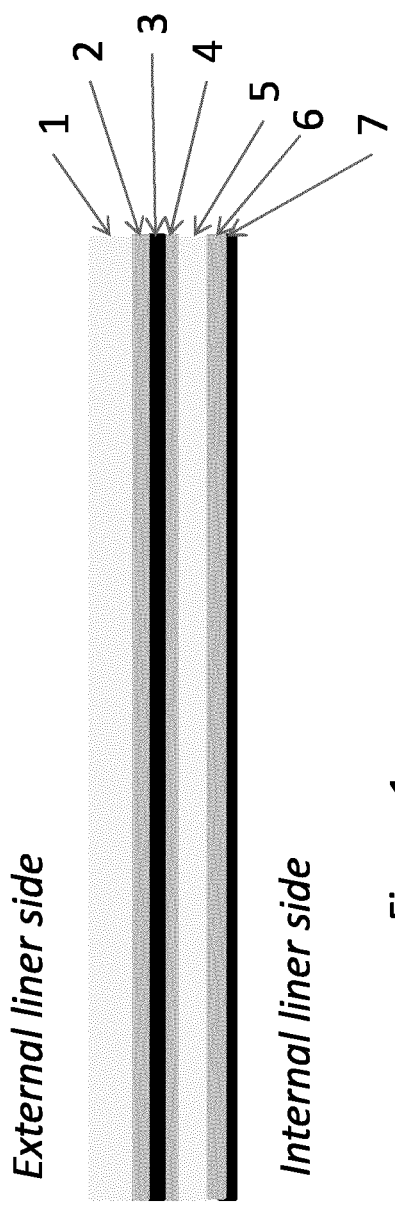
FIG. 1 is a schematic cross-sectional view of a multilayer structure of a plastic liner according to a first particular embodiment of the present invention.
Figure 2:
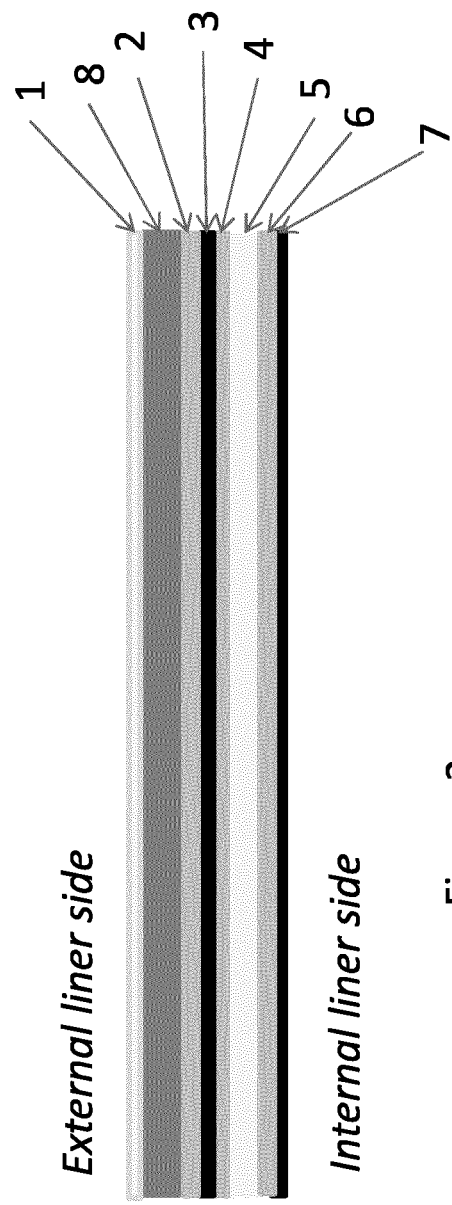
FIG. 2 is a schematic cross-sectional view of a multilayer structure of a plastic liner according to a second particular embodiment of the present invention.
Figure 3:
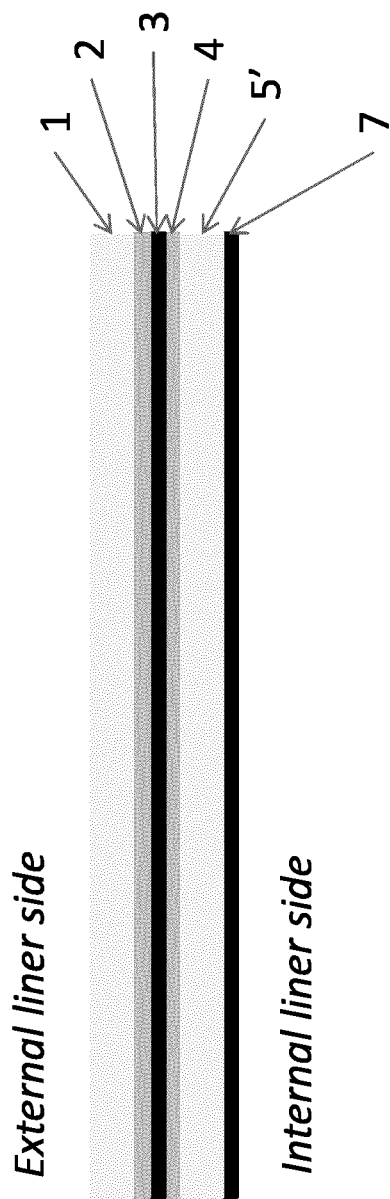
FIG. 3 is a schematic cross-sectional view of a multilayer structure of a plastic liner according to a third particular embodiment of the present invention.
Figure 4:
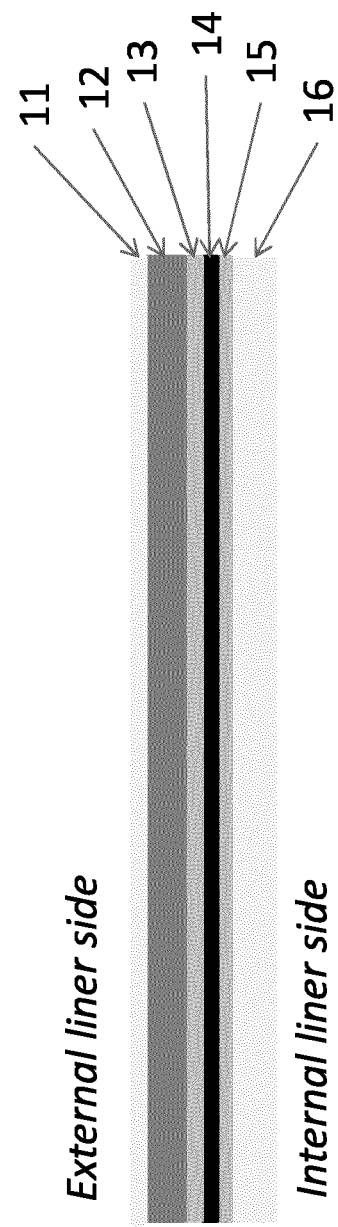
FIG. 4 is a schematic cross-sectional view of a multilayer structure of a plastic liner according to a fourth particular embodiment of the present invention.

The invention claimed is:

1. A hydrogen gas storage container comprising a plastic liner which comprises, in order from the inside to the outside
   an inner layer based on PVDF,
   a first layer of adhesive,
   at least one intermediate layer based on HDPE,
   a second layer of adhesive,
   a barrier layer based on EVOH,
   a third layer of adhesive,
   a layer of re grind, and
   an outer layer based on HDPE,
   wherein said inner layer forms the inner layer of said hydrogen gas storage container and is in contact with hydrogen gas, when present,
   wherein said inner layer has a lower hydrogen permeability than said at least one intermediate layer, and
   wherein when more than one intermediate layer is present the intermediate layers are separated by a layer of adhesive.

2. The hydrogen gas storage container according to claim 1, wherein the inner layer has a higher hydrogen permeability than said barrier layer.

3. The hydrogen gas storage container according to claim 1, wherein the hydrogen permeability of the barrier layer is at least 20% lower compared to the hydrogen permeability of the inner layer.

4. The hydrogen gas storage container according to claim 1, wherein the barrier layer is made of ethylene/vinyl alcohol copolymer (EVOH) with a lower ethylene content than the ethylene content of the inner layer.

5. The hydrogen gas storage container according to claim 1, wherein the inner layer further comprises one or more material selected from the group consisting of polyvinyldichloride (PVDC), aromatic nylon, aliphatic nylon, amorphous nylon, polyethylene terephthalate (PET), LCP, propylene glycol alginate (PGA) and ethylene/vinyl alcohol copolymer (EVOH) with a higher ethylene content than the ethylene content of the first barrier layer.

6. The hydrogen gas storage container according to claim 1, wherein the inner layer further comprises fillers.

7. The hydrogen gas storage container according to claim 1, wherein the inner layer contains polar groups.

8. The hydrogen gas storage container to claim 1, wherein said plastic liner further comprises at least one layer based on a reinforced thermoplastic composition.

9. A hydrogen gas storage container comprising a plastic liner which comprises, in order from the inside to the outside
    an inner layer based on PVOH,
    at least one intermediate layer based on HDPE,
    a barrier layer,
    wherein said inner layer forms the inner layer of said hydrogen gas storage container and is in contact with hydrogen gas, when present,
    wherein said inner layer has a lower hydrogen permeability than said at least one intermediate layer.

\* \* \* \* \*